US011808991B2

(12) United States Patent
Laperriere et al.

(10) Patent No.: US 11,808,991 B2
(45) Date of Patent: Nov. 7, 2023

(54) DEVICE OF DETECTION OF SURFACE DEFECTS ON AT LEAST ONE TERMINAL SURFACE OF AT LEAST ONE OPTICAL FIBER

(71) Applicant: Data-Pixel, Chavanod (FR)

(72) Inventors: Yannick Laperriere, Chapeiry (FR); Julien Maille, Annecy (FR); Eric Tanguy, Saint Priest (FR)

(73) Assignee: Data-Pixel, Chavanod (FR)

( * ) Notice: Subject to any disclaimer, the term of this patent is extended or adjusted under 35 U.S.C. 154(b) by 308 days.

(21) Appl. No.: 17/191,906

(22) Filed: Mar. 4, 2021

(65) Prior Publication Data

US 2021/0286133 A1 Sep. 16, 2021

(30) Foreign Application Priority Data

Mar. 10, 2020 (FR) ...................... 2002362

(51) Int. Cl.
*G02B 6/38* (2006.01)
*G06T 7/136* (2017.01)
*G01N 21/88* (2006.01)
*G01N 21/94* (2006.01)

(52) U.S. Cl.
CPC ......... *G02B 6/385* (2013.01); *G01N 21/8851* (2013.01); *G01N 21/94* (2013.01); *G06T 7/136* (2017.01); *G06T 2207/10* (2013.01)

(58) Field of Classification Search
CPC ............... G01N 21/8851; G01N 21/94; G01N 2021/8883; G01N 2021/9511; G02B 6/385; G02B 21/0004; G02B 21/365; G06T 2207/10; G06T 7/136; G06T 2207/10056;

(Continued)

(56) References Cited

U.S. PATENT DOCUMENTS

| 5,179,419 A | 1/1993 | Palmquist et al. |
| 6,751,017 B2 | 6/2004 | Cassady |
| 7,312,859 B2 | 12/2007 | Koudelka et al. |

(Continued)

FOREIGN PATENT DOCUMENTS

WO  WO-2021067635 A1 * 4/2021 ................ G01J 3/28

OTHER PUBLICATIONS

Mei, Shuang, et al, "Automated Inspection of Defects in Optical Fiber Connector End Face Using Novel Morphology Approaches", Accepted: Apr. 27, 2018; Published: May 3, 2018; Sensors 2018, 18, 1408; doi: 10.3390/s18051408.

(Continued)

*Primary Examiner* — Sunghee Y Gray
(74) *Attorney, Agent, or Firm* — FORGE IP, PLLC

(57) ABSTRACT

A device for detection of surface defects on a terminal surface of an optical fiber. The device includes a digital microscope configured to capture an image of a terminal surface; and a mechanism for analyzing the image configured to detect surface defects present on the terminal surface, the analysis mechanism integrating a "U-Net"-type neural network having had its training phase carried out via an enhancer. The enhancer is configured to create training images, intended to train the neural network, based on reference images. The training images are obtained from the reference images by only applying flips, rotations and/or luminosity, contrast, or shade variations to the reference images.

9 Claims, 10 Drawing Sheets

(58) Field of Classification Search
CPC . G06T 2207/20081; G06T 2207/20084; G06T 2207/30108; G06T 7/0004
USPC ........................................................ 356/73.1
See application file for complete search history.

(56) References Cited

U.S. PATENT DOCUMENTS

| | | | |
|---|---|---|---|
| 7,336,884 B2 | 2/2008 | Zhou et al. | |
| 2015/0278639 A1* | 10/2015 | Leighton | G01M 11/30 |
| | | | 382/203 |
| 2019/0295223 A1* | 9/2019 | Shen | G06T 7/0002 |
| 2019/0339456 A1 | 11/2019 | Ruggles | |
| 2020/0056960 A1* | 2/2020 | Kise | G06K 9/6256 |
| 2020/0356805 A1* | 11/2020 | Sun | G06K 9/6292 |
| 2021/0063274 A1* | 3/2021 | Cote | G06T 7/62 |
| 2021/0150710 A1* | 5/2021 | Hosseinzadeh Taher | |
| | | | G06V 10/82 |

OTHER PUBLICATIONS

Ronneberger, Olaf, et al: "U-Net: Convolutional Networks for Biomedical Image Segmentation"; 18th International Conference, Munich, Germany, Oct. 5-9, 2015; Proceedings, Part III in "12th European Conference on Computer Vision, ECCV 2012"; Jan. 1, 2015; Springer Berlin Heidelberg, Berlin Germany 031559; XP055746424, ISSN: 0302-9743; ISBN: 978-3-642-04427-4; vol. 9351, pp. 234-241.

\* cited by examiner

DEVICE OF DETECTION OF SURFACE DEFECTS ON AT LEAST ONE TERMINAL SURFACE OF AT LEAST ONE OPTICAL FIBER

TECHNICAL BACKGROUND

The invention concerns a device enabling to detect surface defects present on at least a terminal surface of one or a plurality of optical fibers.

Typically, the invention aims at detecting scratches, holes, or debris present on one or a plurality of terminal surfaces integrated in a connector so that an operator can characterize the compliance of the connector, for example, with the IEC 61300-3-35:2015 standard. Indeed, this standard requires for an operator to determine the exact location and size of the surface defects of the terminal surfaces integrated in the connector before this operator can indicate whether a connector is compliant or not. The invention may also be implemented to characterize the compliance of a terminal surface of an optical fiber which is not integrated in a connector.

The invention more specifically concerns the detection of surface defects on one or a plurality of terminal surfaces by means of a digital microscope having its images processed by a neural network. Thus, those skilled in the art know neural networks and their implementation and training methods.

PRIOR ART

The development of communication technologies based on optical fibers has generated increasingly severe constraints on the connections between optical fibers. To form a high-quality connection between two optical fibers, the terminal surfaces of the two optical fibers should be kept clean and intact before being pressed on each other.

According to the invention, a terminal surface of an optical fiber corresponds to the surface which is created when an optical fiber is cut and then polished for its termination. Now, when an optical fiber is polished, scratch-, hole-, or debris-type surface defects may form or deposit on the terminal surface and create disturbances in the transmission of the optical signal at the connection of the optical fiber.

These disturbances may generate a signal loss during a connection between two optical fibers or a reflection of a parasitic optical signal.

As the widths of spectral bands of the light fluxes injected into the optical fibers increase, in particular with the growth of optical fiber multiplexing technology, the need for cleanliness of the terminal surfaces increases. Thus, the manufacturing of an optical fiber connector generally imposes an inspection of each optical fiber by a microscope and a cleaning or repolishing of the terminal surface if surface defects are detected on this terminal surface. This process of quality control of optical fiber connectors is more widely disclosed in documents U.S. Pat. Nos. 6,751,017, 7,312,859, 7,336,884, and 5,179,419.

The use of a binocular microscope to detect surface defects of the terminal surfaces of the optical fibers is often insufficient since surface defects are difficult to see. To enable an operator to characterize the compliance of a connector integrating one or a plurality of optical fibers, for example, with the IEC 61300-3-35:2015 standard, a digital microscope associated with image processing solutions enabling to reveal surface defects is conventionally used, as described in document US 2019/0339456.

Image processing solutions are for example described in Mei, Shuang & Wang, Yudan & Wen, Guojun & Hu, Yang's publication (2018) "*Automated Inspection of Defects in Optical Fiber Connector End Face Using Novel Morphology Approaches*", Sensors. 18. 1408. 10.3390/s18051408.

These solutions use successive image processing steps enabling to extract surface defects: convolution kernel filtering, background separation by thresholding, contour detection, histogram thresholding, morpho-mathematics . . . .

To improve the characterization performed by the operator, it is desired to increase the relevance of the surface defects detected by the image processing means.

In other fields, it is known to detect salient elements on an image by means of a neural network. However, neural networks conventionally require a training phase where the weights of the different neurons of the neural network are modified.

Thus, a neural network having undergone a training phase with a large number of reference images linked to a specific application is capable of detecting the salient elements of a new image corresponding to the same application.

The detection of surface defects on terminal surfaces of optical fibers is a very specific market and there exist no sufficiently complete databases capable of providing reference images sufficient to carry out an efficient training phase with a conventional neural network.

Thus, currently-implemented image processing solutions have a higher performance than conventional neural networks, given the difficulty of detecting salient elements difficult to see with the naked eye and the small number of existing reference images. In the context of the invention, a large number of different neural networks have been tested, which did not succeed in having a higher performance than conventional image processing solutions: particularly, PSPnet- or LinkNet-type neural networks, although they seemed very promising. The DeepLab-type neural network has enabled to obtain an acceptable performance, but its processing time is incompatible with the rapidity requirements of operators acting in the context of the quality control of optical fibers.

The technical problem of the invention thus is to obtain a device of detection of surface defects on at least one terminal surface of at least one optical fiber by means of a neural network, enabling to efficiently and rapidly detect surface defects which are very difficult to see and capable of being trained with few reference images.

DISCUSSION OF THE INVENTION

The invention aims at solving this technical problem by means of a specific neural network structure, called U-Net, normally used in the medical field. Against all expectations, this U-Net-type neural network has a much higher performance than conventional image processing solutions when this neural network is trained by an image enhancer specifically configured to perform flips, rotations, and or luminosity, contrast or shade variations of the reference images.

The U-Net neural network in particularly described in Ronneberger, O., Fischer, P., & Brox, T.'s scientific publication (2015): "*U-Net: Convolutional Networks for Biomedical Image Segmentation*", ArXiv, abs/1505.04597.

However, this U-Net neural network has been developed for medical applications and the advocated deformations of the reference images are linked to the possible deformations of biological tissues.

Now, it is not possible to deform images of terminal surfaces of optical fibers to obtain consistent results by following this biological tissue deformation model. Indeed, a biological tissue may be stretched in one direction or the other while an optical fiber always has a constant diameter. Thus, if those skilled in the art use this U-Net neural network with the enhancer described in this scientific publication, they could not obtain consistent results for terminal surfaces of optical fibers since the deformations used on biological tissues cannot transpose to terminal surfaces of optical fibers. The training phase of this U-Net neural network would thus provide a large number of inaccuracies on the detections thereof.

The invention is thus based on an observation according to which the use of an image enhancer, specifically calibrated to perform flips, rotations, and/or luminosity, contrast, or shade variations of the reference images with a U-Net neural network, enables to improve the relevance of the surface defects detected on at least one terminal surface of at least one optical fiber.

For this purpose, the invention concerns a device of detection of surface defects on at least one terminal surface of at least one optical fiber, said device comprising:
- a digital microscope configured to capture an image of said at least one terminal surface; and
- means for analyzing said image configured to detect surface defects present on said at least one terminal surface.

The invention is characterized in that said analysis means integrate a "U-Net-type" neural network having had its training phase carried out via an enhancer; said enhancer being configured to create training images, intended to train said neural network, based on reference images; said training images being obtained from said reference images by only applying flips, rotations, and/or luminosity, contrast, or shade variations to said reference images.

The invention thus enables to obtain a detection of surface detects which are very difficult to see, present on at least one terminal surface of at least one optical fiber, more efficient than by using the analysis means of the state of the art.

The invention may be used for the detection of a terminal surface of a single optical fiber or of a plurality of optical fibers integrated in a connector. Thus, according to an embodiment, a plurality of optical fibers being gathered in a connector, said digital microscope is configured to capture an image of the terminal surfaces of the optical fibers at the level of said connector; and said analysis means are configured to isolate the terminal surfaces of the optical fibers.

As described in Ronneberger, O., Fischer, P., & Brox, T.'s scientific publication (2015): "*U-Net: Convolutional Networks for Biomedical Image Segmentation*", ArXiv, abs/ 1505.04597, the "U-Net"-type neural network preferably comprises a contracting path and an expansive path with five processing layers each.

A plurality of configurations of the "U-Net" type neural network are possible according to the desired accuracy of the results. Preferably, said contracting path and said expansive path implement, for each processing layer, two processings performing a convolution of three pixels by three pixels followed by a linear rectification. Preferably, said contracting path implements, between each processing layer, a processing performing a concatenation of the local maximum values. Preferably, said expansive path implements, between each processing layer, a processing performing an up-convolution of two pixels by two pixels.

According to the invention, the training of the neural network is performed by an enhancer based on reference images. Preferably, the number of said reference images being in the range from 200 to 400, the enhancer is configured to obtain a number of training images greater than 1,000.

For this purpose, the enhancer may apply predefined processings for each reference image. Preferably, said enhancer randomly chooses to apply or not flips, rotations, and/or luminosity, contrast, or shade variations to said reference images. Preferably, said enhancer also randomly selects the parameters of the flips, rotations, and/or luminosity, contrast, or shade variations applied to said reference images.

DESCRIPTION OF THE DRAWINGS

The way to implement the present invention, as well as the resulting advantages, will better appear from the description of the following embodiments, in relation with the accompanying drawings, in which.

DETAILED DESCRIPTION OF THE INVENTION

Figure 1:
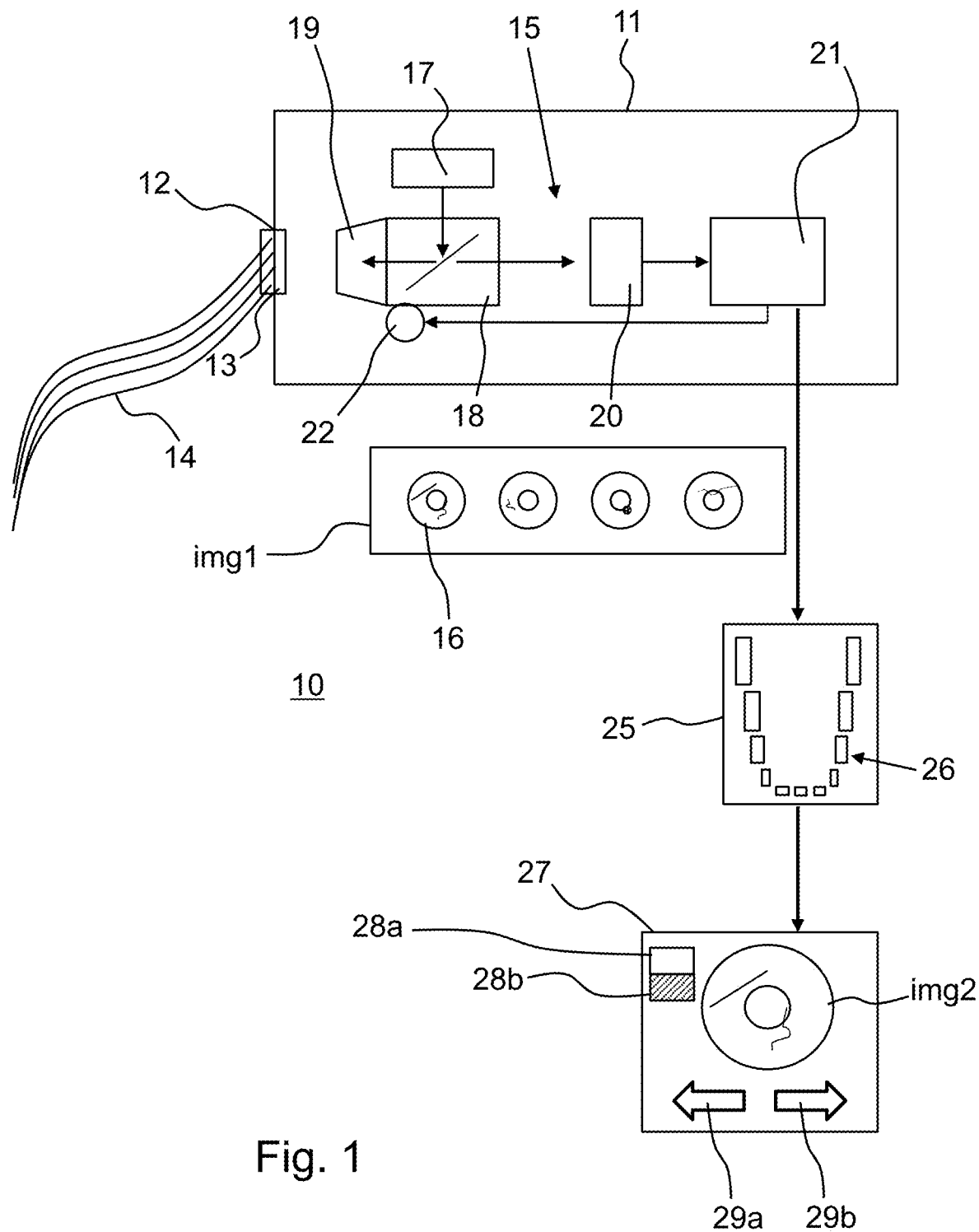
FIG. 1 illustrates a simplified representation of a device of detection of surface defects of four terminal surfaces of four optical fibers according to an embodiment of the invention.

As illustrated in FIG. 1, defect detection device 10 comprises an analysis package 11 provided with an opening 12 intended to receive a connector 13 of optical fiber(s) 14.

This connector 13 conventionally integrates a plurality of optical fibers 14, for example, a row of four optical fibers, as illustrated in FIG. 1. Of course, other connector types may be used without changing the invention. For example, the connector might comprise from one to four rows of twelve or sixteen optical fibers according to the desired applications. Similarly, the connector might integrate a single optical fiber.

Inside of analysis package 11, device 10 comprises a digital microscope 15 configured to capture an image of the terminal surfaces 16 of the optical fibers 14 integrated in connector 13. For example, digital microscope 15 may have a light source 17 applied to a two-way mirror 18 so that the light flux emitted by light source 17 is directed onto connector 13 by passing through focusing means 19. The light flux is then reflected by connector 13 and it crosses two-way mirror 18 to be captured by an image sensor 20, for example, a CMOS (for "Complementary Metal Oxide Semiconductor", that is, a semiconductor circuit using the complementarity of metals and of oxides) or CCD ("Charge Coupled Device", that is, a circuit using a charge transfer and storage) sensor.

Analysis package 11 may also comprise a supervision member 21, for example, a microcontroller, configured to edit the image acquired by image sensor 20 to deliver a sharp image img1 of connector 13. For this purpose, supervision member 21 may control a focusing member 22 capable of displacing two-way mirror 18 and/or focusing means 19.

At the output of package 11, the image img1 acquired by digital microscope 15 is transmitted to analysis means 25, for example a computer or a server. These analysis means 25 are configured to analyze the image originating from digital microscope 15 and reveal the surface defects of the terminal surfaces 16 of each optical fiber 14 to an operator. Thus, these analysis means 25 are conventionally coupled to a display interface 27, intended for the operator, so that he/she can more rapidly see the surface defects detected by these analysis means 25.

Conventionally, display interface 17 offers an image img2 corresponding to an enlargement of one of the terminal surfaces 16 of the optical fibers 14 of connector 13. In the example of FIG. 1, image img2 corresponds to an enlargement of the first terminal surface 16 arranged at the left end of the connector 13 illustrated in image img1. In addition to this enlargement, image img2 also comprises a highlight, preferably colored, of the detected surface defects. The thickness or the color of the highlight preferably depends on the magnitude of each surface defect.

Under image img2, display interface 27 has buttons 29a, 29b enabling an operator to select another terminal surface 16 of an optical fiber 14 to be inspected. Further, on a left-hand side of image img2, display interface 27 may also emit an opinion concerning the compliance of the terminal surface 16 of optical fiber 14 at the IEC 61300-3-35:2015 standard, which opinion is advisory only for the operator. In addition to these elements of display interface 27, the latter may also display other data for the operator, for example, data relative to each observed surface defect or recommendations for the treatment of terminal surface 16 according to the observed surface defects. Thus, display interface 27 may vary without changing the invention.

The invention more particularly lies in the analysis means 25 which isolate the terminal surfaces 16 of the optical fibers 14 of connector 13 and which detect the surface defects on each terminal surface 16. The surface defect detection is performed by a neural network 26, of U-Net type.

Figure 2:
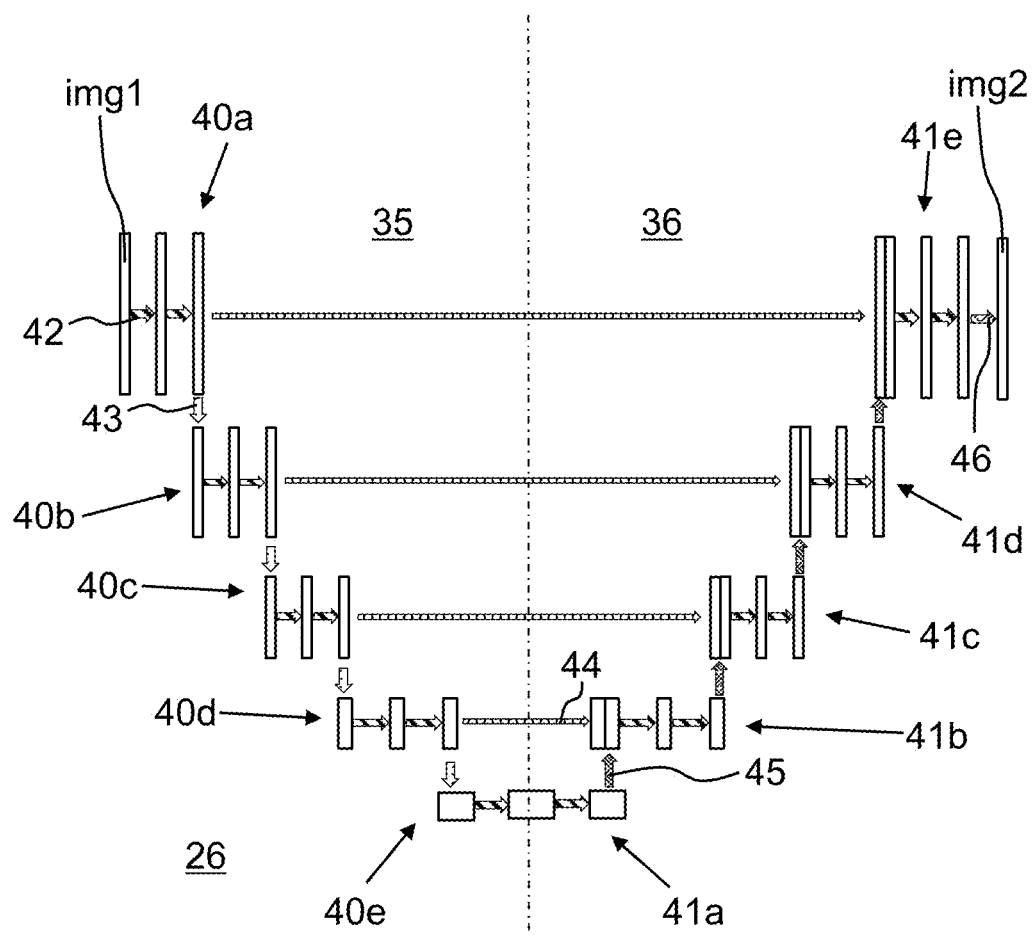
FIG. 2 illustrates a simplified representation of the structure of the neural network comprised in the detection device of FIG. 1.

As illustrated in FIG. 2, this neural network 26 comprises a contracting path 35 and an expansive path 36. Contracting path 35 is intended to receive image img1 to detect the salient elements of this image while expansive path 36 is intended to locate and characterize the salient elements detected by contracting path 35 to identify the type and the magnitude of the surface defects of a terminal surface 16 of an optical fiber 14. FIG. 2 only illustrates an embodiment of neural network 26.

In this example, first image img1 may have a resolution of 512 by 512 pixels. In contracting path 35, processings 42 perform a convolution of three pixels by three pixels followed by a linear rectification and processings 43 perform a concatenation of the local maximum values. A first processing layer 40a uses two successive processings 42 to transform input image img1 into 64 images of 570 by 570 pixels and then into 64 images of 568 by 568 pixels. The image thus obtained is then submitted to processing 43 to obtain an image of $284^2$ pixels.

This image is placed at the input of a second processing layer 40b where two successive processings 42 are used to obtain two groups of 128 images having a resolution of $282^2$ and $280^2$ pixels. The obtained image is submitted to processing 43 before being placed at the input of a third processing layer 40c, where two successive processings 42 are used to obtain two groups of 256 images having a resolution of $138^2$ and $136^2$ pixels.

Similarly, the obtained image is submitted to processing 43 before being placed at the input of a fourth processing layer 40d, where two successive processings 42 are used to obtain two groups of 512 images having a resolution of $66^2$ and $64^2$ pixels. The obtained image is submitted to processing 43 before being placed at the input of a fifth processing layer 40e, where two successive processings 42 are used to obtain two groups of 1,024 images having a resolution of $30^2$ and $28^2$ pixels.

The two processings 42 integrated in this fifth processing layer 40e enable to pass from contracting path 35 to expansive path 36. Thus, the last image of the first processing layer 41a of this expansive path 36 is used to form the first image of the second processing layer 41b by means of two processings 44 and 45. A processing 44 recovers the last image of the fourth processing layer 40d of contracting path 35 and concatenates this image with the last image of the first processing layer 41a modified by processing 45. This processing 45 performs an up-convolution of two pixels by two pixels. These processings 44 and 45 enable to obtain a first group of 1,024 images of a $56^2$ pixel resolution for the first image of second processing layer 41b.

This image group is then submitted to two successive processings 42 to obtain two groups of 512 images having a resolution of $54^2$ and $52^2$ pixels.

The obtained image is submitted to processings 44 and 45 before being placed at the input of a third processing layer 41c where two successive processings 42 are used to obtain two groups of 256 images having a resolution of $102^2$ and $100^2$ pixels. Similarly, the obtained image is submitted to processings 44 and 45 before being placed at the input of a fourth processing layer 41d where two successive processings 42 are used to obtain two groups of 128 images having a resolution of $198^2$ and $196^2$ pixels.

Figure 3:
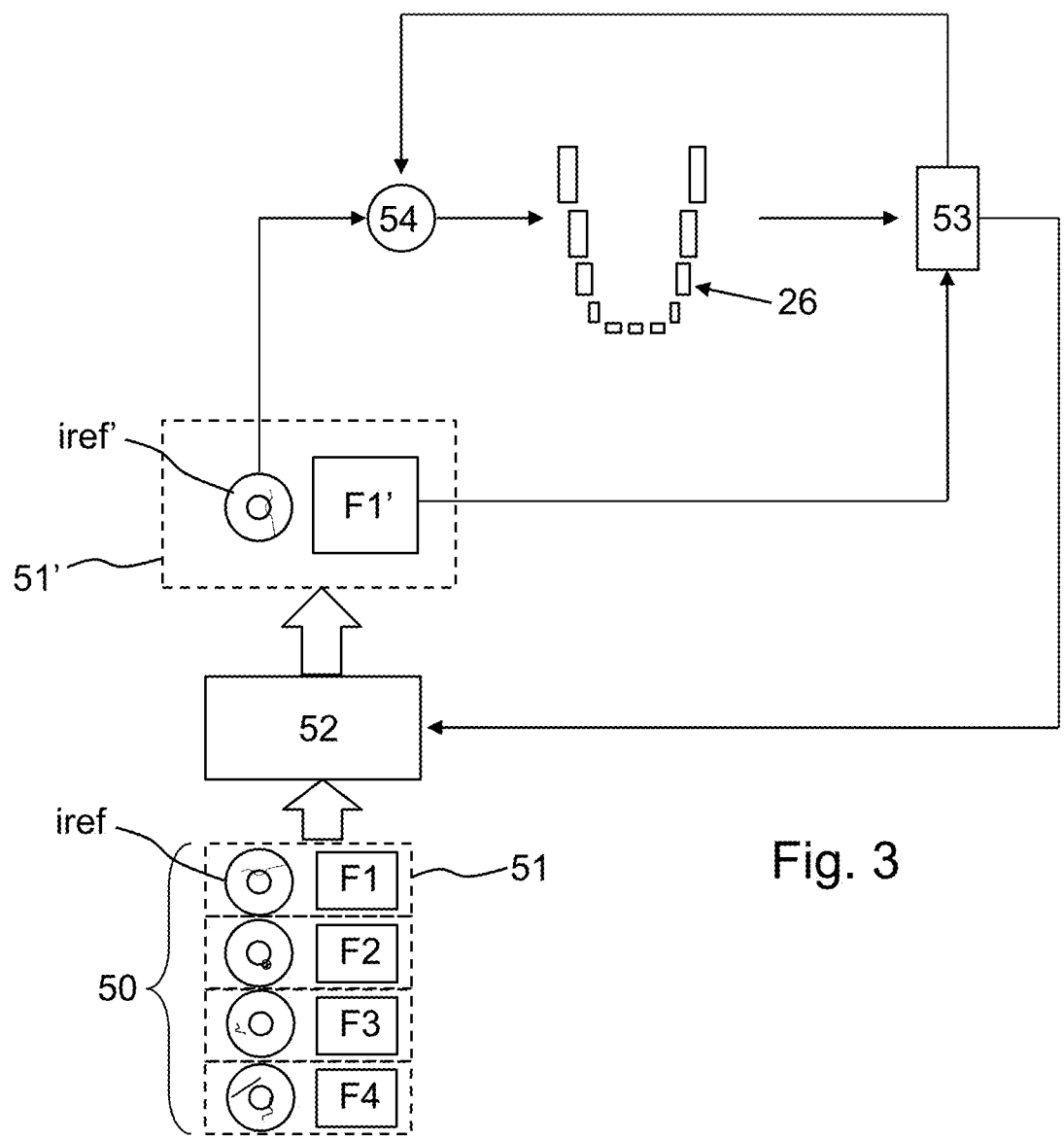
FIG. 3 illustrates a simplified representation of the training step of the neural network of FIG. 2.

A last time, the obtained image is submitted to processings 44 and 45 before being placed at the input of a fifth processing layer 41e where two successive processings 42 are used to obtain two groups of 64 images having a resolution of 390 by 390 pixels and 388 by 388 pixels. At the end of these two processings 42, the obtained image is submitted to a last processing 46 enabling to obtain image img2 integrating a highlighting of surface defects. For this purpose, the last processing 46 corresponds to a convolutional product of one pixel by one pixel enabling to obtain two images of 388 by 388 pixels. Neural network 26 has weights associated with each of processings 42 to 46, which should be modified in a training phase, illustrated in FIG. 3.

In this training phase, a set of training data 50 are delivered to neural network 26. For all training data 50, neural network 26 searches for the maximum consistency between a reference image iref and the expected data, stored in a file F1-F4 and distinct for each reference image iref. These expected data may appear in the form of an image img2 and/or of a list of surface defects observed with their types, their positions, and their magnitudes.

For each pair 51 of reference images iref and of expected data F1, an enhancer 52 performs one or a plurality of processings to obtain a pair 51' integrating a training image iref', modified or not, and expected data F1' modified as a consequence of the processings undergone by reference image iref.

This pair 51' is used for the training of neural network 26 by the placing of training image iref' in an input image management module 54 and by the placing of the expected data F1' in a comparator 53, configured to compare the data obtained at the output of neural network 26 with the expected data F1'. If the difference between the data obtained at the output of neural network 26 and the expected data F1' is greater than a threshold value, one or a plurality of weights of processings 42 to 46 are modified and training image iref' is replaced at the input until the difference becomes smaller than the threshold value.

This neural network 26 as well as its training phase are more particularly described in Ronneberger, O., Fischer, P., & Brox, T.'s scientific publication (2015): "*U-Net: Convolutional Networks for Biomedical Image Segmentation*", ArXiv, abs/1505.04597.

The invention more particularly lies in the operation of the enhancer 52 associated with neural network 26, of U-Net type, for an application of detection of surface defects on at least one terminal surface 16 of at least one optical fiber 14.

Conversely to enhancers currently used with a U-Net-type neural network, the invention provides using an enhancer 52 only using flips, rotations, and/or luminosity, contrast or shade variations on reference images iref.

Figure 4A:
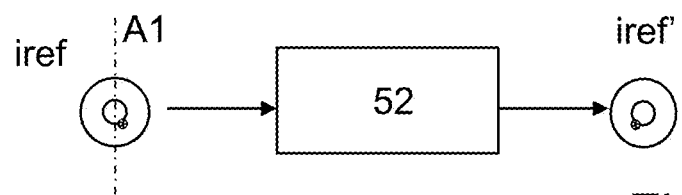
FIG. 4*a* illustrates a flip-type transformation obtained by the enhancer of the training step of FIG. 3.

As illustrated in FIG. 4a, a flipping of a reference image iref to obtain a training image iref' is performed with respect to an axis of symmetry A1 running through the center of terminal surface 16 and cutting this terminal surface 16 into two equal portions. The angular orientation of this axis of symmetry may vary from 0 to 180° with respect to the axis of symmetry A1 illustrated in FIG. 4a.

Figure 4B:
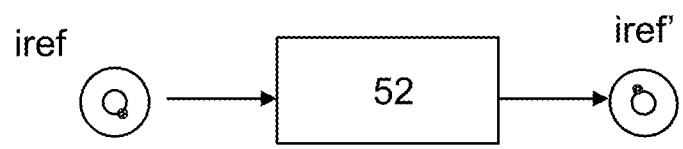
FIG. 4*b* illustrates a rotation-type transformation obtained by the enhancer of the training step of FIG. 3.
Figure 4C:
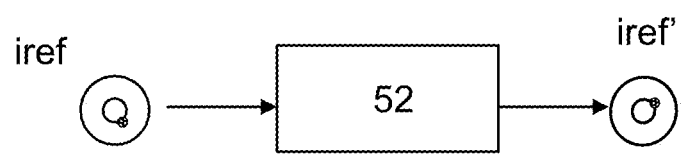
FIG. 4*c* illustrates a transformation of rotation and contrast variation type obtained by the enhancer of the training step of FIG. 3.

The center of the terminal surface 16 of reference image iref is also used to perform rotations, as illustrated in FIGS. 4b and 4c.

In FIG. 4b, only one rotation is used by enhancer 52 while, in FIG. 4c, enhancer 52 uses both a rotation and a contrast variation. Further, the rotations angles are different between FIGS. 4b and 4c. Thus, when enhancer 52 chooses to perform a rotation, it may vary this rotation between 0 to 360°. Similarly, when enhancer 52 chooses to perform luminosity, contrast, or shade variations, it may select the characteristics of these variations.

Whatever the processings performed by enhancer 52, the latter must also accordingly modify the expected data F1.

For example, if dust is reported in the lower right-hand portion of a terminal surface 16, as illustrated on the reference image iref of FIG. 4a, the modified expected data F1' should notify the dust on the lower left-hand portion of the terminal surface.

The processings carried out by enhancer 52 may be predefined for each pair 51. For example, each reference image iref of each pair 51 may form four training pairs 51' integrating:

a training image iref' obtained with no processing by enhancer 52;

a training image iref' obtained by means of a flipping along axis A1 and a 30% luminosity variation;

a training image iref' obtained by means of a rotation by 30° and a 30% contrast variation; and a training image iref' obtained by means of a rotation by 60° and a 30% shade variation.

Preferably, the number and the processings performed by enhancer 52 are defined randomly for each pair 51. For example, the number of processings may be defined by a Gaussian function having its center close to four processings per pair 51. Finally, the processings are also selected in a random fashion, aiming at not repeating the same processings too often.

The enhancer is thus configured to transform a number of pairs 51 in the range from 200 to 400 into more than 1,000 pairs 51'.

Figure 5A:
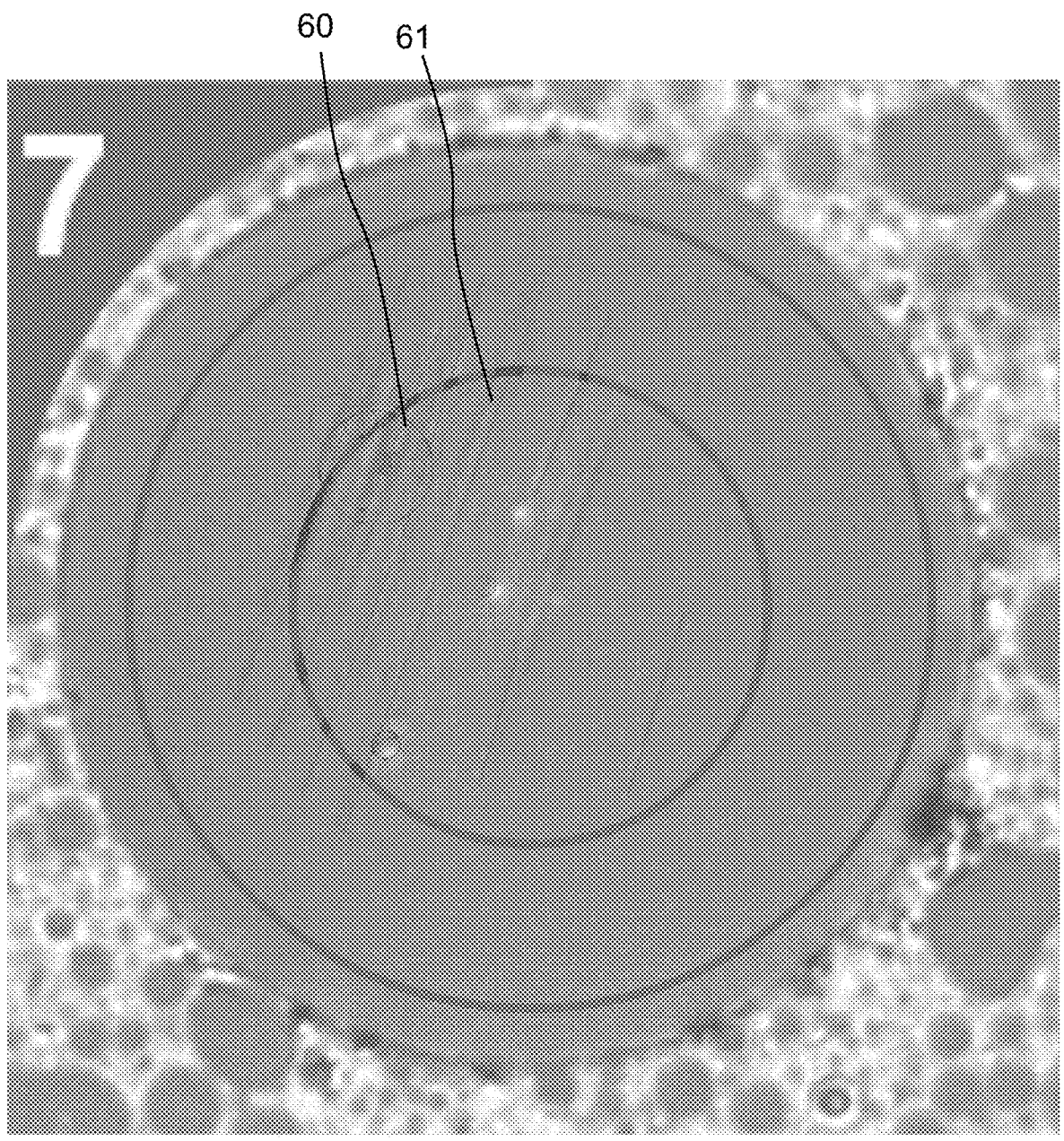
FIG. 5*a* illustrates an image of a first terminal surface having its surface defects detected by a device of the state of the art.
Figure 5B:
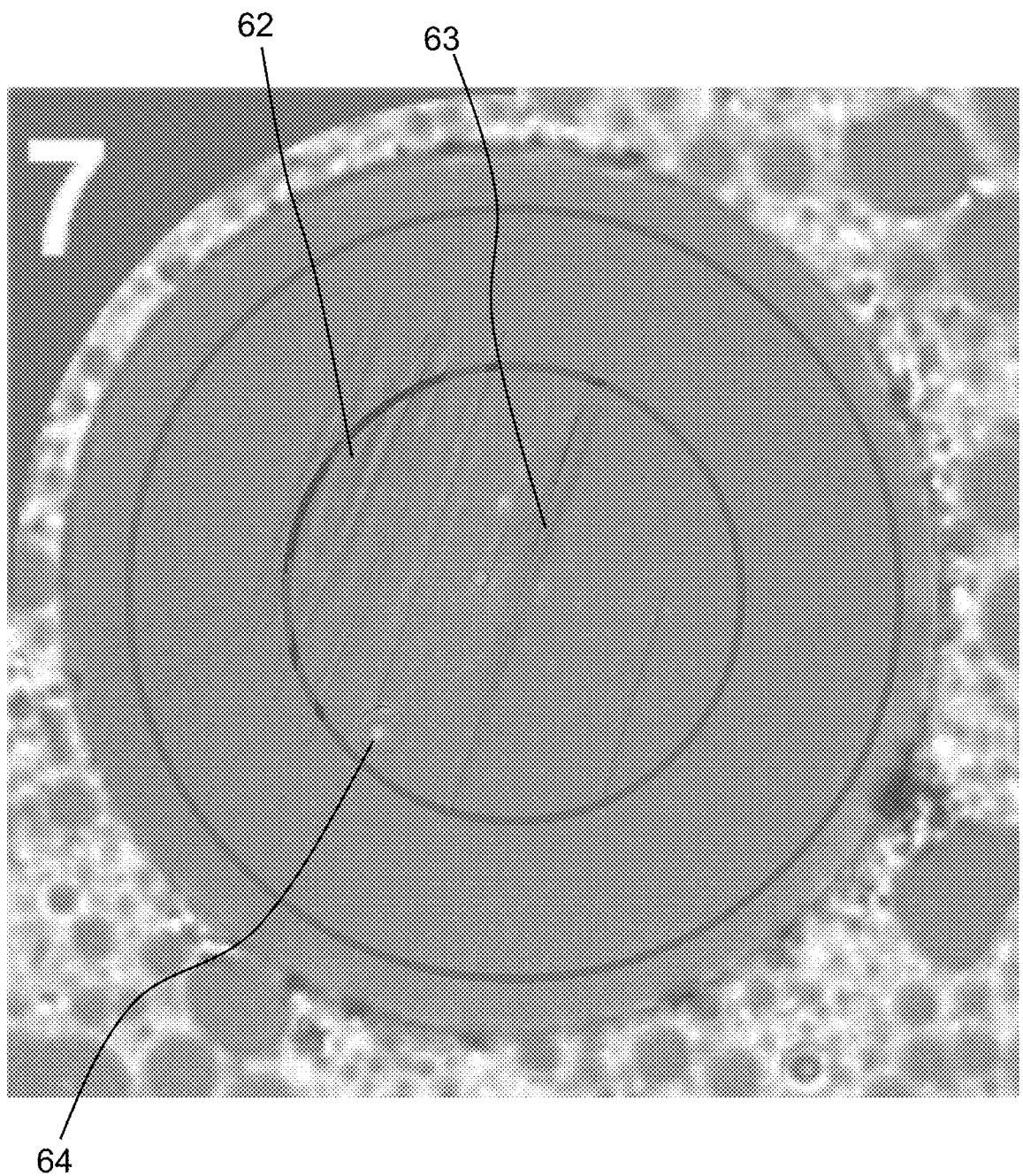
FIG. 5*b* illustrates an image of the first terminal surface of FIG. 5*a* having its surface defects detected by the device of FIG. 1.

Thereby, these pairs 51' enable to obtain an efficient operation of neural network 26. As illustrated in FIGS. 5a and 5b, the results obtained from a surface defect detection device of the state of the art, FIG. 5a, and the results obtained from the device 10 of the invention, FIG. 5b, are different.

In the example of FIGS. 5a to 5f, display interface 27 has circles surrounding dust- or hole-type surface defects and highlights surrounding scratch-type surface defects.

Further, minute surface defects are surrounded or highlighted in green while significant surface defects are surrounded or highlighted in red. The upper left-hand corner of the image is illuminated in red when the device detects that surface defects are significant and it is illuminated in green when the device detects that surface defects are minute.

In the example of FIG. 5a, a hole- or dust-type surface defect 60 is detected as being significant, as well as a scratch 61. However, surface defect 60 is not correctly characterized since it consists of the presence of a plurality of scratches at the same location. In FIG. 5B, the detection device 10 of the invention observes a significant defect 62, corresponding to a scratch at the location of the surface defect 60 of FIG. 5a, and it observes that the scratch 61 detected in FIG. 5a is not a significant scratch.

Then, a scratch 63 is also characterized as a significant scratch as well as a hole or dust 64.

As a result, by using the data delivered in FIG. 5a, an operator may select treatments for repolishing the terminal surface which are less efficient that those that he/she could implement by using the data of FIG. 5b.

Figure 5C:
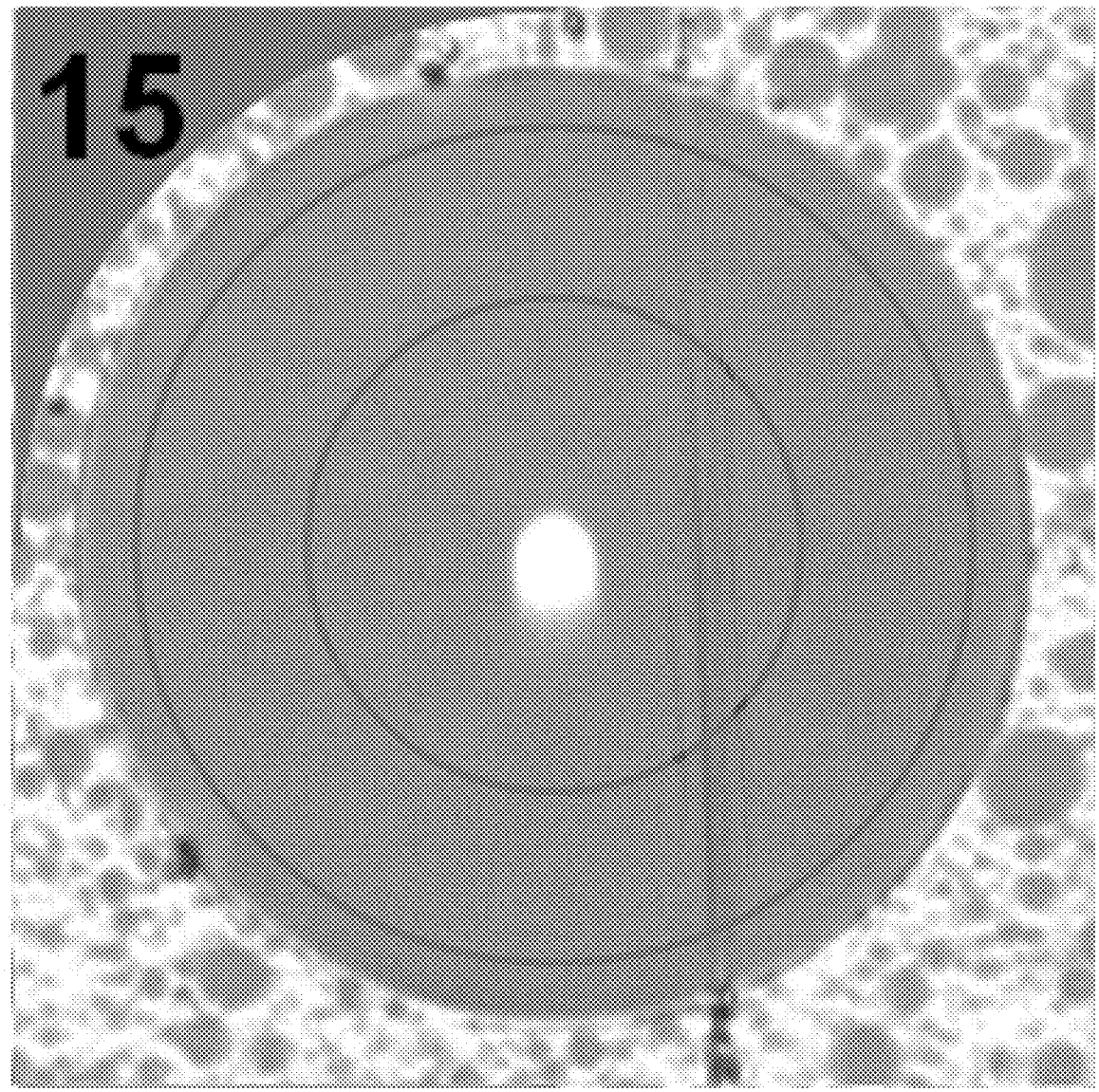
FIG. 5*c* illustrates an image of a second terminal surface having its surface defects detected by a device of the state of the art.
Figure 5D:
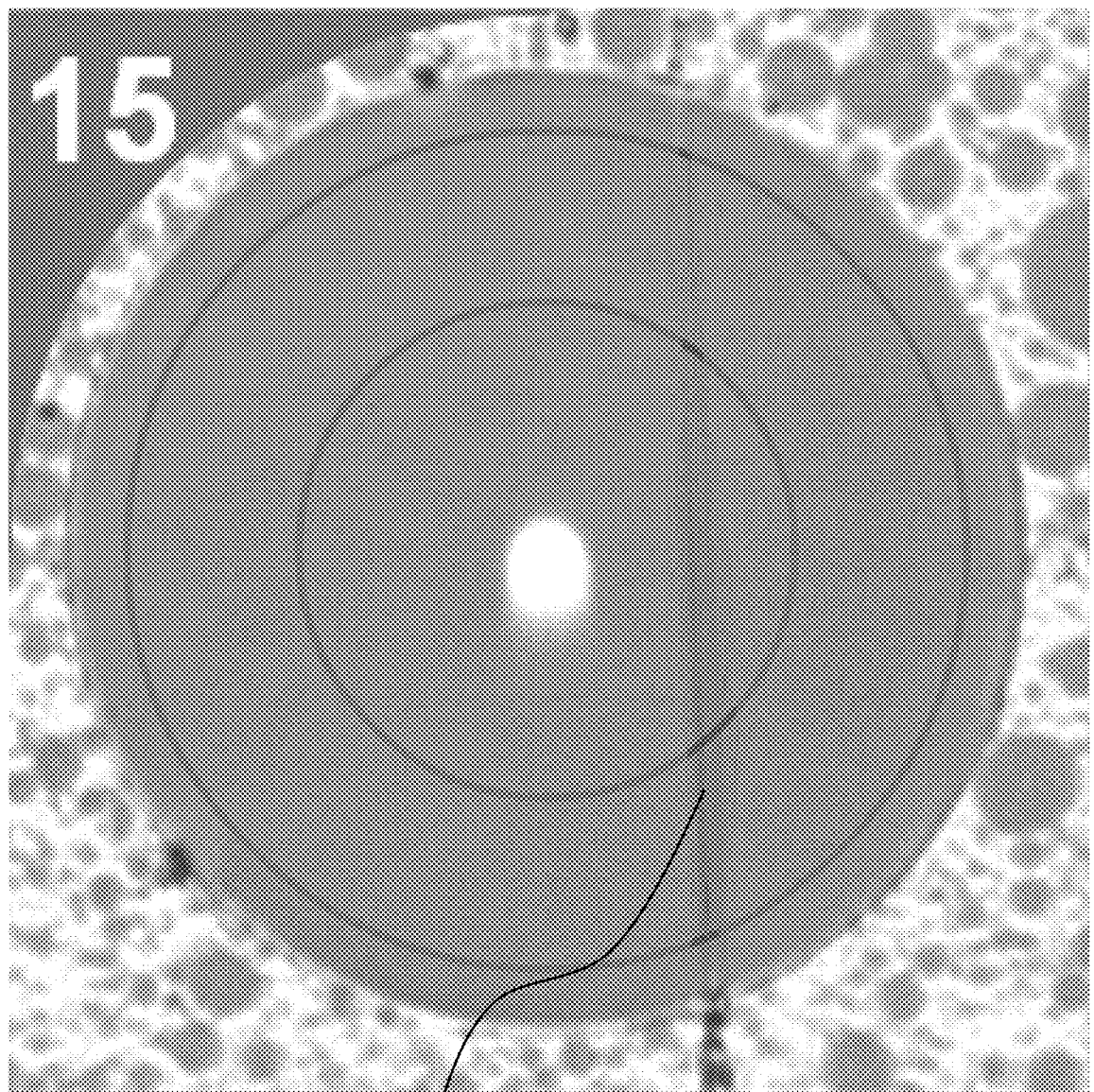
FIG. 5*d* illustrates an image of the second terminal surface of FIG. 5*c* having its surface defects detected by the device of FIG. 1.

The difference between the detection device 10 of the invention and that of the state of the art is more significant in the example of FIGS. 5c and 5d since, in the case of FIG. 5c, no significant surface defect is detected and the device concludes that the terminal surface is compliant while, in the case of FIG. 5d for the same terminal surface, the detection device 10 of the invention indicates that a scratch 65 is significant and concludes that the terminal surface is not compliant and should be repolished at the location of scratch 65.

Figure 5E:
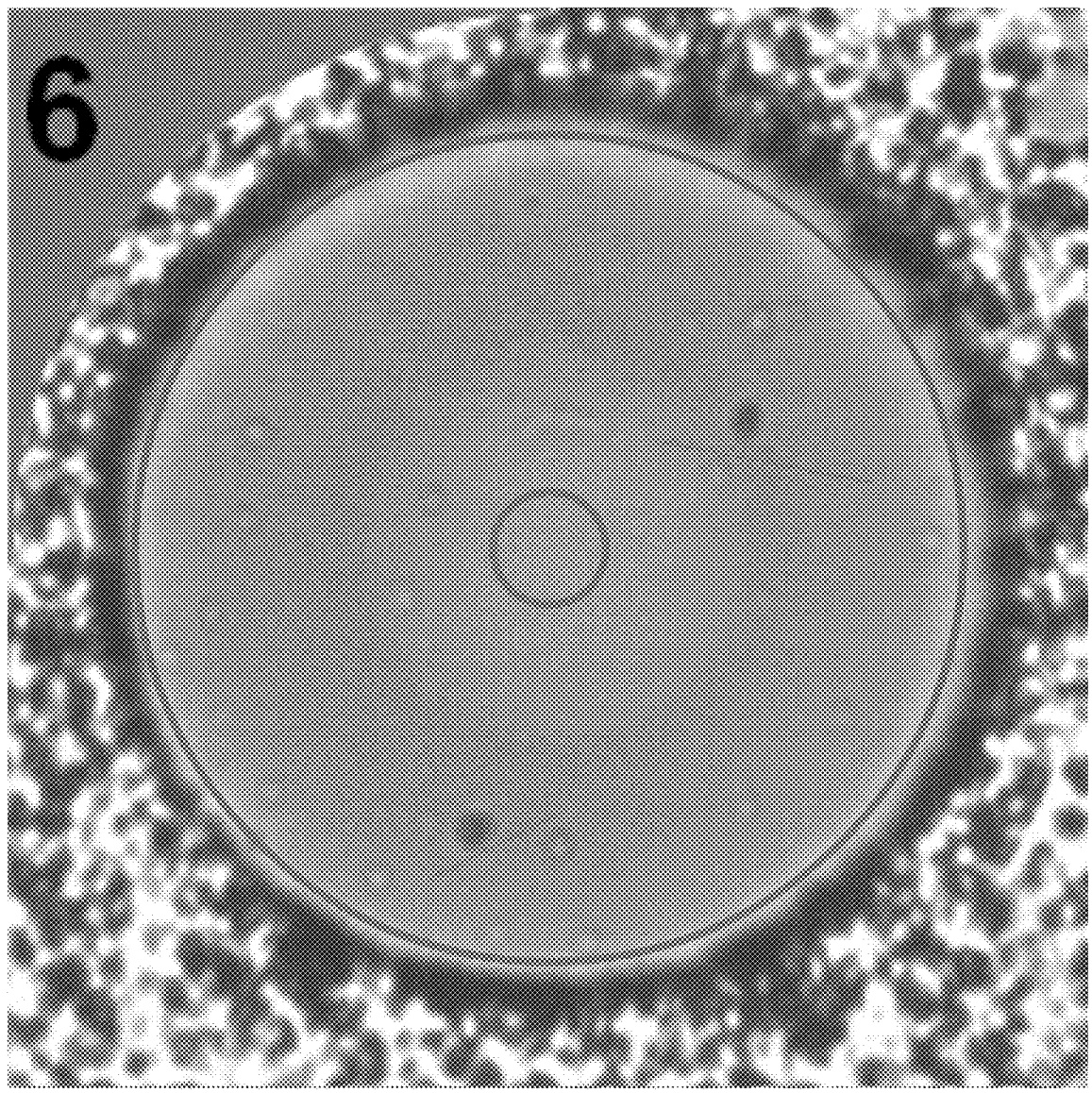
FIG. 5*e* illustrates an image of a third terminal surface having its surface defects detected by a device of the state of the art.
Figure 5F:
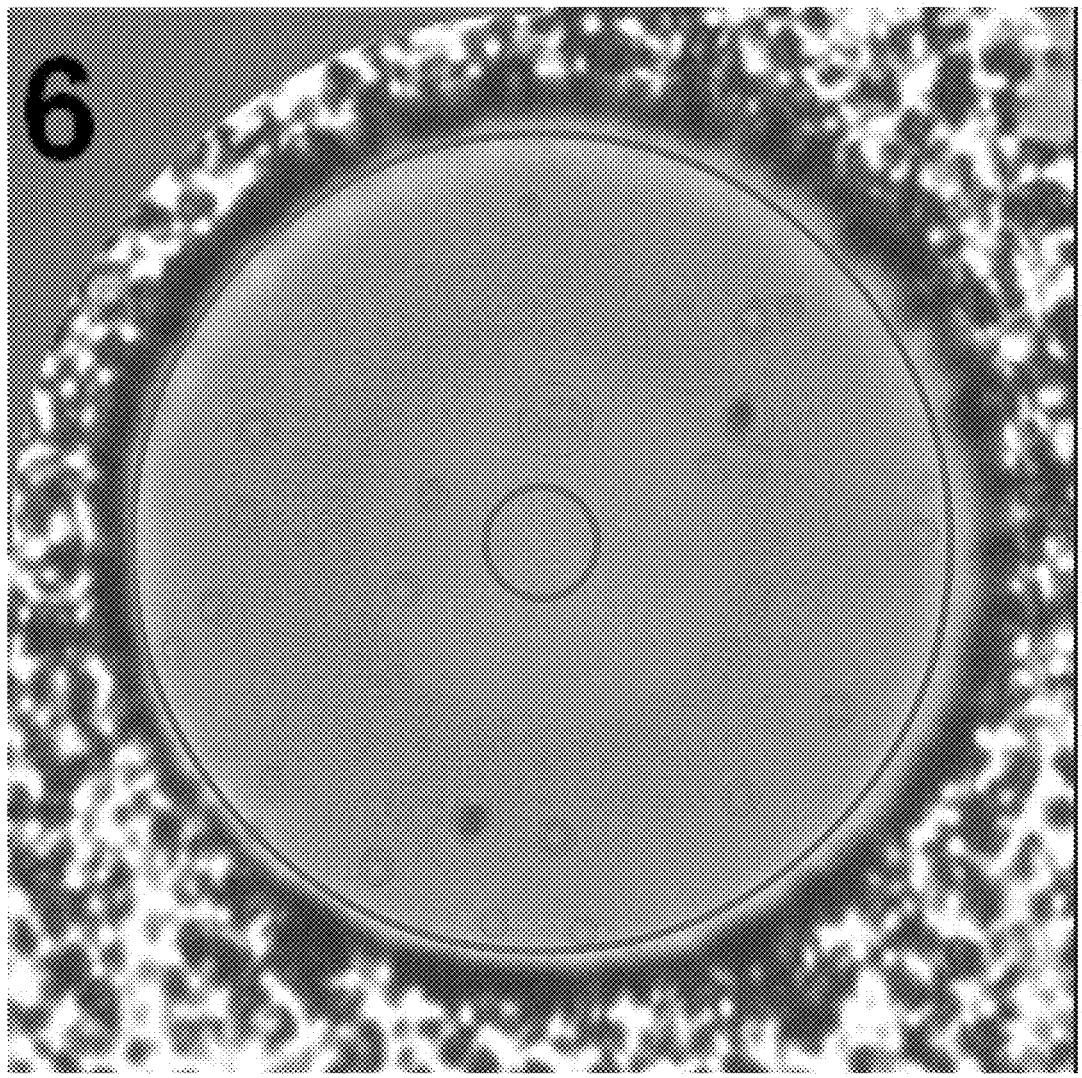
FIG. 5*f* illustrates an image of the third terminal surface of FIG. 5*e* having its surface defects detected by the device of FIG. 1.

In the case of FIGS. 5e and 5f, the two terminal surfaces are considered as being compliant but the detection device 10 of the invention enables to detect more minute hole- or dust-type defects than that of the state of the art.

Thus, the invention enables to improve the detection of the surface defects of a terminal surface of an optical fiber and thus, to improve the quality of the subsequently-formed optical connections.

The invention may be implemented to detect the compliance of the terminal surface 16 of one or a plurality of optical fibers 14 to the IEC 61300-3-35:2015 standard. Further, the invention may also be implemented to inspect non-standard polarization maintaining optical fibers, optical fibers with a specific core, or also optical fibers with a specific optical cladding.

Polarization maintaining optical fibers comprise elements visible on the acquired image of terminal surface 16, such as bars of different shapes or also an asymmetrical optical sheath. The optical sheath is also called cladding in literature.

For conventional inspection methods, these elements degrade the quality of the inspection while the neural network 26 of the invention, trained with images of polarization maintaining optical fibers by using the enhancer 52 of the invention, enables to obtain an improved detection performance.

Similarly, optical fibers with a specific core often comprise rings visible on the acquired image of terminal surface 16 and optical fibers with a specific optical cladding often have structures comprising holes on the acquired image of terminal surface 16, for example, photonic crystals. Once again, the neural network 26 and the enhancer 52 of the invention enable to improve the performance of detection of these types of optical fibers.

In addition to the terminal surfaces 16 of the optical fibers, the neural network 26 and the enhancer 52 of the invention also enable to perform an inspection of the supports of the optical fibers, for example, ferrules used to associate a plurality of optical fibers. For this purpose, the neural network 26 of the invention is trained with images of ferrules by using the enhancer 52 of the invention to detect surface defects capable of appearing at the level of the ferrules.

The invention claimed is:

1. A surface defect detection device for detecting surface defects on at least one terminal surface of at least one optical fiber, said device comprising:
    a digital microscope configured to capture an image of said at least one terminal surface; and
    means for analyzing said image configured to detect surface defects present on said at least one terminal surface;
characterized in that said means for analyzing comprises a U-Net neural network having had its training phase carried out via an enhancer;
    said enhancer is configured to create training images, for training said neural network, from reference images by only applying flips, rotations or luminosity, contrast, or shade variations to said reference images, wherein the created training images are configured to detect the surface defects.

2. The surface defect detection device according to claim 1, wherein one or a plurality of optical fibers is gathered in a connector, said digital microscope is configured to capture an image of the terminal surfaces of the optical fibers at the level of said connector; and said means for analysing are configured to isolate the terminal surfaces of the optical fibers.

3. The surface defect detection device according to claim 1, wherein said "U-Net"-type neural network comprises a contracting path and an expansive path with five processing layers each.

4. The surface defect detection device according to claim 3, wherein said contracting path and said expansive path implement, for each processing layer, two processings performing a convolution of three pixels by three pixels followed by a linear rectification.

5. The surface defect detection device according to claim 3, wherein said contracting path implements, between each processing layer, a processing performing a linear concatenation of the local maximum values.

6. The surface defect detection device according to claim 3, wherein said expansive path implements, between each processing layer, a processing performing an up-convolution of two pixels by two pixels.

7. The surface defect detection device according to claim 1, wherein the number of said reference images is in the range from 200 to 400, and the enhancer is configured to obtain a number of training images greater than 1,000.

8. The surface defect detection device according to claim 1, wherein said enhancer randomly chooses to apply or not flips, rotations, or luminosity, contrast, or shade variations to said reference images.

9. The surface defect detection device according to claim 1, wherein said enhancer randomly selects the parameters of the flips, rotations, or luminosity, contrast or shade variations applied to said reference images.

* * * * *